Aug. 2, 1938. T. C. BROMLEY ET AL 2,125,423
KNOTTER
Filed June 21, 1937  3 Sheets-Sheet 1
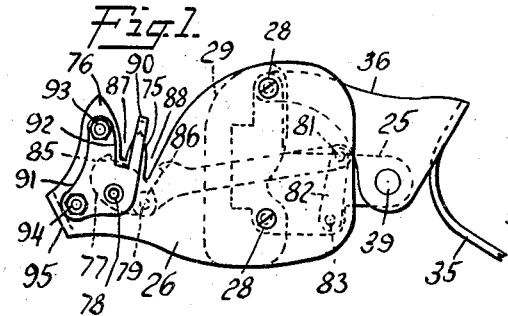
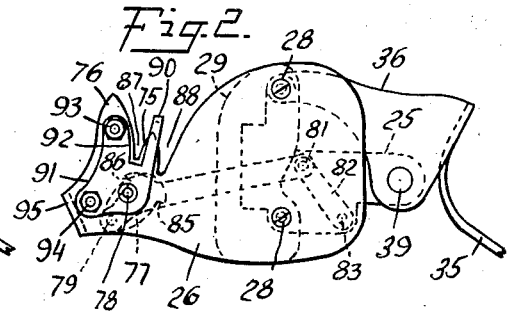
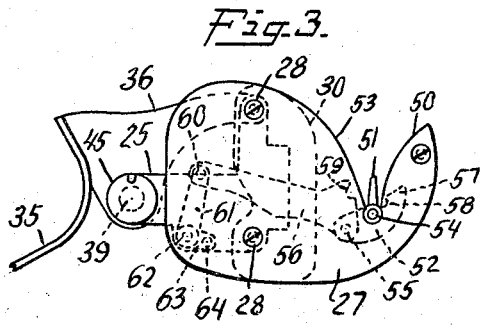
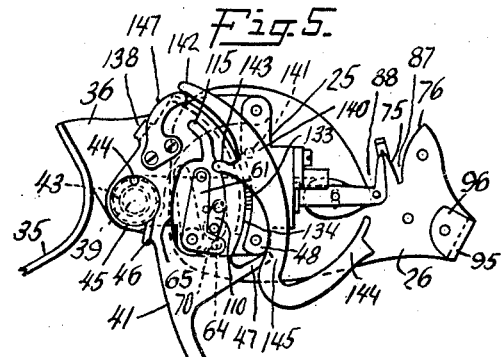
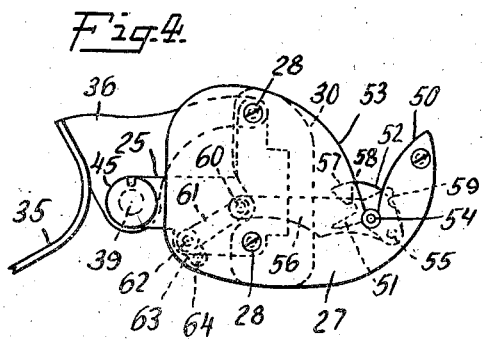
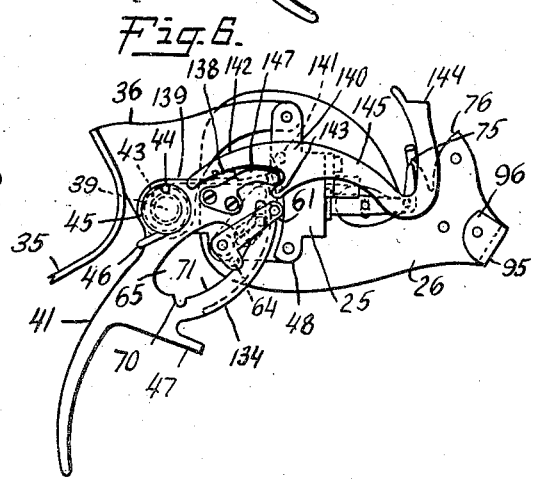
INVENTOR
Thomas Charles Bromley
Guy Storr Helliwell
BY
Marshall & Hawley
ATTORNEYS Aug. 2, 1938. T. C. BROMLEY ET AL 2,125,423
KNOTTER
Filed June 21, 1937 3 Sheets-Sheet 2
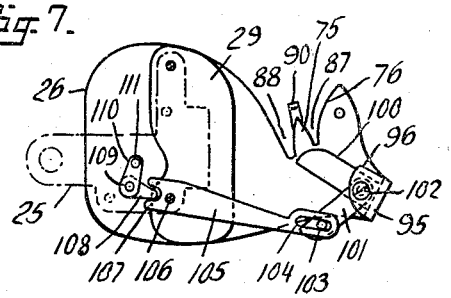
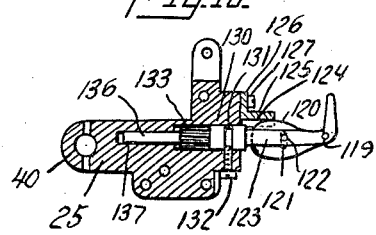
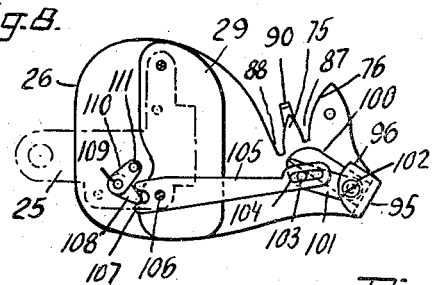
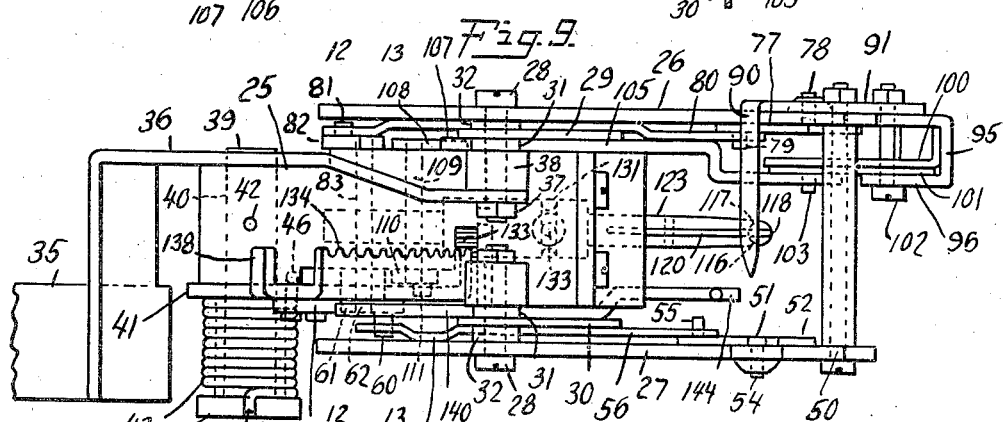
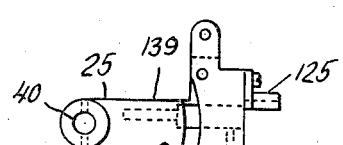
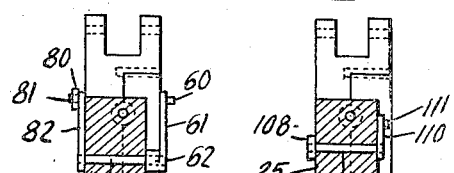
INVENTOR
Thomas Charles Bromley
Guy Storr Helliwell
BY
Marshall & Hawley
ATTORNEYS

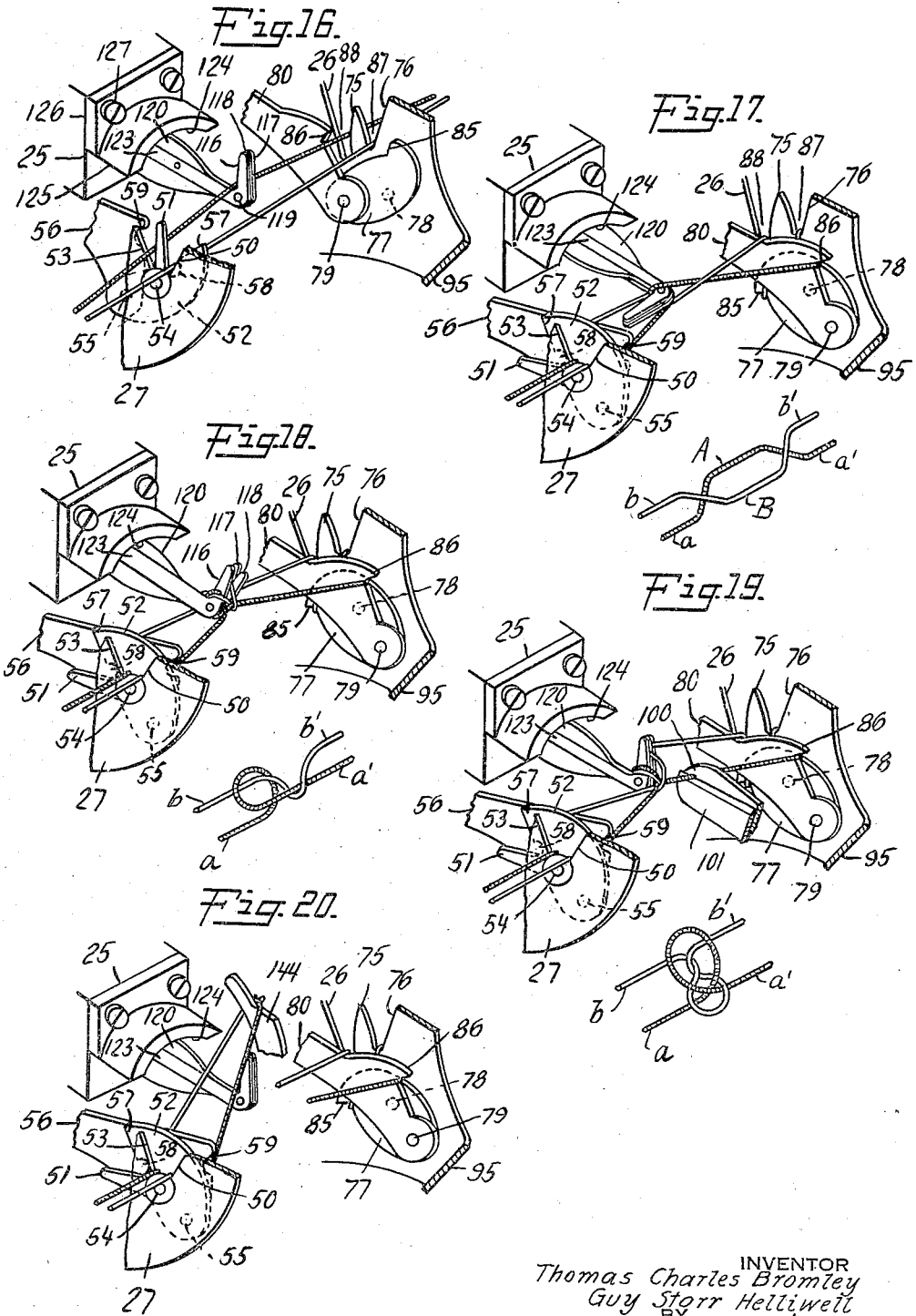

Patented Aug. 2, 1938

2,125,423

UNITED STATES PATENT OFFICE 2,125,423

KNOTTER

Thomas Charles Bromley and Guy Storr Helliwell, Leicester, England

Application June 21, 1937, Serial No. 149,412

10 Claims. (Cl. 289—3)

This invention relates to knotters, and particularly to knotters of the type used for tying weaver's knots.

More particularly stated, the invention relates to knotters of the general type disclosed in Tatlock Patent 1,983,953, granted December 11, 1934. In this type of knotter the threads to be tied are disposed in guiding and positioning notches and are initially substantially parallel. When the knotter is operated the ends of the threads are crossed and the tying bill is rotated and moves downwardly between the two crossed ends at one side of the knotter and upwardly on the opposite side, one end of the crossed threads at the opposite side being severed by a knife carried by the tying bill, and the other end being severed by shears, the end being severed by the tying bill knife being held in the tying bill until the knot has been pulled tight and stripped from the bill.

This invention has for its salient object to provide a simple and practical knotter of the character described that will have a minimum number of parts and can be economically manufactured.

Another object of the invention is to provide a knotter of the character described so constructed and arranged that the knot will be tied quickly and efficiently and will be pulled tight as it is stripped from the tying bill.

Further objects of the invention will appear from the following specification taken in connection with the drawings which form a part of this application, and in which Fig. 1 is a side elevation of one side of the knotter illustrating the thread guiding and positioning means in the position taken before the knotter is operated;

Fig. 2 is a view similar to Fig. 1 but showing the thread guiding and positioning means in the position taken after the operating lever of the knotter has been depressed and the ends of the thread on the side of the knotter illustrated have been crossed;

Fig. 3 is a view similar to Fig. 1 but showing the opposite side of the knotter and the thread guiding and positioning means in the position taken prior to the operation of the knotter;

Fig. 4 is a view similar to Fig. 2 but illustrating the thread guiding and positioning means shown in Fig. 3 in the position taken after the knotter lever has been depressed to actuate the guiding and positioning means and cross the ends of the threads;

Fig. 5 is an elevational view taken from one side of the knotter with the side plate removed to disclose the operating mechanism in the position of the parts prior to the operation of the knotter;

Fig. 6 is a view similar to Fig. 5, illustrating the parts in the positions taken after the operation of the knotter;

Fig. 7 is an elevational view illustrating the operating levers for the knife or shear which cuts one of the thread ends, prior to the operation of the shear;

Fig. 8 is a view similar to Fig. 7 but illustrating the parts in the positions taken after the operation of the shear, or with the shear blade closed;

Fig. 9 is a top plan view of the knotter on an enlarged scale;

Fig. 10 is a sectional elevation taken through the main supporting block and tying bill;

Fig. 11 is an end elevation of the tying bill and block and adjacent parts, this view being taken at right angles to Fig. 10;

Figs. 12 and 13 are transverse sectional elevations taken substantially on lines 12—12 and 13—13 of Fig. 9;

Fig. 14 is a side elevation of the main supporting block;

Fig. 15 is a top plan view of the block; and

Figs. 16-20 inclusive, are fragmentary perspective views illustrating the successive positions of the knotter parts from their initial positions prior to the operation of the knotter to the final positions taken after the knot has been tied, the successive positions of the threads during the tying of the knot being illustrated in connection with these figures.

The invention briefly described consists of a simplified construction of weaver's knotter in which substantially all of the operative parts are carried by or mounted on a supporting block, to which the side plates of the knotter are secured. The knotter includes guiding and positioning links or levers disposed within the side plates and operated by lever actuating means carried by the supporting block and set in operation by the main actuating hand operated lever which is also pivoted on the block. The knotter also includes levers and lever actuating means for the knife or shear which are also carried by the supporting block and are actuated by the same actuating lever.

In the construction of the knotter illustrated, the supporting bracket for the cutter is formed integral with one of the side plates, this plate being flanged at the front end and bent backwardly into position parallel to the plane of the side plate to form the supporting bracket. The rotatable knotter bill is mounted in and supported on the main supporting block and can be easily and quickly assembled thereon or removed therefrom. The bill is rotated by means of a rack formed integral with the main actuating lever which engages a pinion formed on the hub or main bearing portion of the knotter bill.

Further details of the invention will appear from the following description.

In the particular embodiment of the invention illustrated in the drawings, the knotter parts are all carried by and mounted on a main supporting block 25 to which are secured side plates 26 and 27 by screws 28.

A second or inner plate is secured between each side plate and the block, these inner plates being designated 29 and 30, the inner plates being spaced from the block by washers 31 and the outer plates being spaced from the inner plates by washers 32.

The handle for the knotter which is shown at 35 in Fig. 9 has formed thereon an arm 36 which is secured by a nut 37 to a lug 38 formed on the block 25, the arm 36 also being engaged by a pin or stud 39 which extends through and is secured in an opening 40 in the block 25.

The operating lever 41 is pivoted on the pin 39, the pin 39 being held against rotation in the opening 40 by means of a pin 42. A spring 43 has one end 44 secured to a head 45 formed on the pin 39, the other end of the spring, as shown at 46, being hooked around the rear edge of the operating lever 41. The spring 43 is tensioned to normally hold the lever 41 in the position shown in Fig. 5, this position being determined by the engagement of a lug 47 formed on the lever 41 with the bottom portion 48 of the block 25.

The side plate 27 has formed on the front end thereof an upwardly extending prong or lug 50. In their initial positions the ends of the threads which extend beyond the side plate 27 of the knotter are positioned between an upwardly extending tine 51 formed on a thread positioning and guiding lever 52 and the rear edge of the lug or prong 50 and also between the tine 51 and the edge 53 of the side plate 27.

The lever 52 is pivoted at 54 to the side plate 27 and is also pivoted at 55 to a thread guiding and positioning lever or link 56. The lever 52 has also formed thereon an upwardly extending lug 57 having a notch 58 at the base thereof.

The lever 56 has a notch 59 formed in the front edge thereof and the rear end of the lever 56 is pivoted at 60 to an arm 61 of a bell crank lever which in turn is pivoted at 62 to the block 25 and extends beyond the pivot 62 to form the other arm 63 of the bell crank lever. Arm 63 has formed thereon a pin 64 which extends in the opposite direction from the pivot pin 60 at the upper end of the arm 61.

All of the parts of the knotter are actuated by the operation of the main operating lever 41, this lever having its central portion cut out, as shown at 65, to form a series of actuating and controlling cams. At the lower edge of the cut out portion 65 there is formed a notch 70 in which the pin 64 is initially seated. As soon as the lever 41 is rotated from the initial position shown in Fig. 5 in a clockwise direction, the bell crank lever 61, 63 will also be rotated in a clockwise direction from the position shown in Fig. 5 to the position shown in Fig. 6. The rotation of the bell crank lever will cause the thread positioning and guiding members or levers to be actuated to cross the ends of the threads in the manner shown in Fig. 17.

When the bell crank lever 61, 63 has been rotated in the manner described, the pin 64 will engage an arcuate edge or surface 71 of the cut out portion 65 of the lever 41, the bell crank lever thus being held in its actuated position against further displacement until the operating lever 41 has returned to its initial position.

From the showing in Fig. 9 it will be noted that the lever 56 is positioned between the side plate 27 and the plate 30, the lever having an offset or bent portion 72 which engages the plate 27 and holds the lever in the proper position.

When the levers 52 and 56 are actuated from the position shown in Fig. 3 to the position shown in Fig. 4, the ends a, b of the threads A, B will be moved, respectively, forwardly and rearwardly to crossed position, as shown in Fig. 17, it being understood that these ends are engaged by and positioned in the notches 59 and 58. Furthermore, as the ends of the threads are so moved they will be positioned between the levers 52 and 56, thus being frictionally held and tensioned.

The other plate 26 has formed on its front end a pair of upwardly extending tines or prongs 75 and 76 for properly positioning the ends of the threads which extend beyond the side plate 26.

A lever 77 similar to the lever 52 is pivoted at 78 to the side plate 26 and is also pivoted at its rear end at 79 to the front end of a link or lever 80, the rear end of the lever 80 being pivoted at 81 to an actuating arm 82 which is carried by or mounted on a spindle or shaft 83. The shaft 83 is rotatably mounted in the block 25 and is secured at its other end to the bell crank lever 61, 63 at 62.

The lever 77 has formed on its upper end a hook 85 and a hook 86 is formed on the upper end of the front end of the lever 80.

As the levers 77 and 80 are actuated by the actuation of the bell crank lever 61, 63, the lever 80 will be moved forwardly, thus causing the lever 77 to move rearwardly. During this movement the two ends a' and b' of the threads A and B which are positioned in the notches 87 and 88 formed by the tines or prongs 75 and 76, will be crossed in the manner shown in Fig. 17.

In order to assist in guiding the threads into their initial substantially parallel position, a finger 90 carried by a plate or bracket 91 is mounted on the side plate 26 and extends transversely across the knotter, as shown particularly in Fig. 9. The plate 91 is notched, as shown at 92, in the manner corresponding to the notch 87, the plate 91 being secured to the side plate 26 at 93 and 94.

The front end of the plate 26 is bent or flanged at right angles to the plane of the plate, as shown at 95 in Fig. 9, and is bent rearwardly, as shown at 96, into a plane parallel to the plane of the side plate 26. This forms a U-shaped bracket for supporting the knife or shear by which the end of one of the threads adjacent the plate 26 is severed. The shear comprises a fixed blade 100 which is secured in the U-shaped bracket formed at the front end of the plate 26 and a pivoted blade 101 which is mounted on a pivot 102. The rear end of the pivoted blade 101 has secured thereto and extending laterally therefrom a pin 103 which is positioned in a slot 104 formed in the front end of a lever 105 mounted on a stud or pin 106 carried by the block 25. The rear end of the lever 105 is bifurcated or forked, as shown at 107. The lever 105 is actuated by means of an arm 108, one end of which is positioned in the fork 107, the other end of the arm being secured to a spindle or shaft 109 mounted in the block 25 and extending therethrough to the opposite side thereof. The other end of the spindle or shaft 109 has secured thereto an arm 110 which has mounted on the upper end thereof and projecting laterally therefrom a pin 111. The pin 111 is disposed in the opening 65 of the main operating lever 41 and is actuated by a cam slot 115 which communicates with the opening 65 and extends upwardly from the upper end thereof. It will thus be seen that the pin 111 and arm 110 will remain in their initial position until the operating lever 41 has nearly completed its operative movement. However, when the pin 111 enters the cam slot 115 the arm 110 will actuate the shaft or spindle 109 to which the arm 108 is secured. The arm 108 will then move in a clockwise direction from the position shown in Fig. 7 to the position shown in Fig. 8, thus closing the shear or moving the pivoted shear blade 101 into coacting relation to the fixed blade 100 and severing the end a' of the thread A.

The rotating bill is constructed and actuated in the following manner: The bill proper comprises a pair of upwardly extending parallel tines 116 and 117, between which is positioned a pivoted knife or blade 118. The blade 118 is pivoted at 119 and in back of the pivot the blade takes the form of a flat cam plate 120. The plate is slotted at 121 and a pin 122 carried by the shank 123 of the bill extends through the slot 121. The cam plate 120 engages the undersurface 124 of an arcuate plate 125 having an upwardly extending flange 126 at the rear end thereof secured to the block 25 by screws 127. The contour of the cam plate 120 is so designed that as the tying bill is rotated the engagement of the edge of the cam plate 120 with the arcuate plate 125 will cause the blade 118 to open at a predetermined position in the rotation of the tying bill, so that the end b' of the thread B will be positioned between the opened blade and the tines 116 and 117 of the tying bill and will be severed by the knife 118, the severed end being held in position until the knot is stripped from the tying bill. This position of the parts is illustrated particularly in Fig. 17.

The tying bill shank 123 has formed thereon a hub 130, the tub having a peripheral groove 131 formed therein, in which is positioned the inner end of a screw 132 carried by the block 25. Thus, the tying bill can be easily assembled on or removed from the block. The rear end of the hub 130 has formed thereon or secured thereto a pinion 133 which is engaged by a rack 134 which is formed on a flange 135 on the lever 41. A spindle 136 extends rearwardly from the pinion 133 and is positioned in a bore 137 formed in the block 135.

The operative movement of the lever 41 and rack 134 is limited by the engagement of a lug 138 which extends laterally from the lever 41 with the upper surface 139 of the block 25.

After the knot has been tied it is removed from the tying bill by means of a stripper 140. The stripper 140 consists of a lever which is pivoted at 141 to the block 25. A tail 142 of the stripper lever extends rearwardly from the pivot 141 and a hook or lug 143 extends downwardly therefrom below the pivot 141. The forward end of the lever consists of a hook 144 which extends upwardly and a curved portion 145 between the hook 144 and the pivot 141.

The stripper is actuated by an upwardly and forwardly extending curved lug 147 which is secured to the main operating lever 41. The stripper lever is normally held in the position shown in Fig. 5 by the engagement of the rear edge of the curved portion 45 with the washer 31. During the initial portion of the movement of the operating lever 41 the lug 147 moves downwardly without causing any movement of the stripper lever until the undersurface of the lug 147 engages the lug 143 carried by the stripper lever. Thereupon, the stripper lever is swung upwardly at a relatively rapid rate and by its engagement with the threads the stripper strips the knot from the tying bill. As the lever 41 is swung back to its initial position under the action of the spring 43, the stripper will return to its normal position shown in Fig. 5 under the action of gravity, and also by the action of lug 147 with the tail 142.

Operation

The operation of the knotter will be clear from the illustration in Figs. 16–20, inclusive. The threads are first placed across the knotter in the manner shown in Fig. 16 whereupon the lever 41 is swung downwardly or in a clockwise direction. The operation of the lever will cause the actuation of the levers 56 and 80 and of the levers 52 and 77 which are pivoted thereto. The actuation of these elements will cause the ends of the threads to be crossed in the manner shown in Fig. 17. The operation of the lever 41 also causes the rotation of the tying bill which passes downwardly in the manner shown in Fig. 17 and then moves upwardly, during the upward movement the knife blade 118 carried by the tying bill being opened and the end b' of the thread B being positioned between the knife blade and the tying bill tines 116 and 117 in the manner shown in Fig. 18. Also, the actuation of the operating lever will cause the pivoted shear blade 101 to move upwardly as the lever approaches the limit of its operative movement, as shown in Fig. 6, the shear blade causing the end a' of the thread A to be severed in the manner shown in Fig. 19.

As the operating lever 41 approaches the limit of its operative movement the lug 147 will engage the lug 143 on the stripper lever, thus moving the stripper in an anticlockwise direction about the pivot 141 and causing the knot to be stripped from the tying bill. Upon the release of the lever 41 the lever will return to its initial position under the actuation of the spring 43.

From the foregoing description it will be evident that a simple, practical and compact knotter has been designed and that this knotter comprises a minimum number of parts and will operate efficiently to perform the desired functions.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What we claim is:

1. In a knotter, a supporting block, side plates secured thereto, a thread guiding and positioning lever pivoted to each side plate adjacent the front end thereof and a second thread positioning and guiding lever pivoted to each of said first levers and movable in a direction opposite thereto, actuating means pivoted in said block and pivoted to each of said second levers, and an operating lever pivoted to said block and having a cam formed therein for actuating and controlling said lever actuating means.

2. In a knotter, a supporting block, side plates secured thereto, a thread guiding and positioning lever pivoted to each side plate adjacent the front end thereof and a second thread positioning and guiding lever pivoted to each of said first levers and movable in a direction opposite thereto, actuating means pivoted in said block and pivoted to each of said second levers, and an operating lever pivoted to said block and having a cam formed therein for actuating and controlling said lever actuating means, said lever actuating means comprising a bell crank lever on one side of the block, and a lever arm on the other side of the block, said bell crank lever and arm being connected to a shaft extending transversely through the block, one arm of the bell crank lever engaging the operating lever cam.

3. In a knotter, a supporting block, side plates secured thereto, a thread guiding and positioning lever pivoted to each side plate adjacent the front end thereof and a second thread positioning and guiding lever pivoted to each of said first levers and movable in a direction opposite thereto, actuating means pivoted in said block and pivoted to each of said second levers, and an operating lever pivoted to said block and having a cam formed therein for actuating and controlling said lever actuating means, said thread positioning and guiding levers being disposed inside the side plates.

4. In a knotter, a supporting block, side plates, a thread guiding and positioning lever pivoted to each side plate adjacent the front end thereof and a second thread positioning and guiding lever pivoted to each of said first levers and movable in a direction opposite thereto, actuating means pivoted in said block and pivoted to each of said second levers, and an operating lever having a cam formed therein for actuating and controlling said lever actuating means.

5. In a knotter, a pair of side plates, means connecting the side plates, thread guiding and positioning means adjacent each side plate, an operating lever, means operated by the lever for actuating the thread guiding and positioning means, one side plate having its front end bent transversely and back on itself substantially parallel to the plane of the side plate to form a U-shaped bracket, a cutter comprising a stationary and a pivoted blade mounted in said bracket, a lever connected to the pivoted blade, means mounted on the plate connecting means for actuating the lever for the pivoted blade, an operating lever, and means including a cam on the operating lever for operating pivoted blade actuating lever, said cam being operative as the operating lever approaches the limit of its operative movement.

6. In a knotter, a supporting block, side plates mounted thereon, thread guiding and positioning means adjacent each side plate for crossing the ends of the threads to be tied, a tying bill having a shank rotatably mounted in said block and having a pinion thereon, and an operating lever for the knotter pivoted on said block and having a rack engaging said pinion.

7. In a knotter, a supporting block, side plates mounted thereon, thread guiding and positioning means adjacent each side plate for crossing the ends of the threads to be tied, a tying bill having a shank rotatably mounted in said block and having a pinion thereon, and an operating lever for the knotter pivoted on said block and having a rack engaging said pinion, said tying bill shank and said block having coacting means including a groove in the shank and a removable pin in the block for holding the shank against longitudinal movement in the block.

8. In a knotter having means to position a pair of threads in spaced relation thereacross, means at the sides of the knotter for crossing the end portions of said threads, a tying bill, means to rotate the tying bill, a thread severing device and a stripper, and an operating lever having a cut out portion so formed as to provide a plurality of cams for successively actuating the thread crossing means and thread severing means, said lever also having means for actuating the tying bill and the stripper.

9. In a knotter, a supporting block, side plates secured thereto and spaced therefrom, levers disposed adjacent each side plate for crossing the threads to be tied, a cutter carried by one side plate, a shaft mounted in the block and operatively connected to the thread crossing levers, a second shaft mounted in the block and operatively connected to the cutter, actuating arms mounted on said shafts, and an operating lever mounted on the block having cams for actuating said arms to operate the thread crossing means and the cutter.

10. In a knotter, a supporting block, side plates, a tying bill having a hub mounted for rotation in said block, a pinion formed on the hub, an operating lever having a rack meshing with the pinion, and coacting means on the block and hub for holding the hub and bill against longitudinal movement in the block, said block bore in which the hub is mounted, said pinion and said hub being so dimensioned that the bill, hub and hub pinion can be withdrawn from the block when the holding means is removed.

THOMAS CHARLES BROMLEY.
GUY STORR HELLIWELL.